(12) United States Patent
Alary (10) Patent No.: US 12,524,756 B2
(45) Date of Patent: Jan. 13, 2026

(54) PERSONALIZATION DEVICE AND METHOD FOR INTEGRATED CIRCUIT CARD

(71) Applicant: STMicroelectronics International N.V., Geneva (CH)

(72) Inventor: Philippe Alary, Puyloubier (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/632,120

(22) Filed: Apr. 10, 2024

(65) Prior Publication Data

US 2024/0354742 A1    Oct. 24, 2024

(30) Foreign Application Priority Data

Apr. 20, 2023   (FR) ...................................... 2303983

(51) Int. Cl.
*G06Q 20/34* (2012.01)
*G06V 40/13* (2022.01)

(52) U.S. Cl.
CPC ....... *G06Q 20/3552* (2013.01); *G06Q 20/352* (2013.01); *G06V 40/13* (2022.01)

(58) Field of Classification Search
CPC ............ G06Q 20/3552; G06Q 20/352; G06Q 20/356; G06V 40/13; G06K 7/015; G06K 19/0718; G06K 19/07769; G06K 7/10188; G06K 7/10178; H04B 5/77; G06F 21/32; G07F 7/1016
See application file for complete search history.

(56) References Cited

U.S. PATENT DOCUMENTS

| | | | |
|---|---|---|---|
| 7,333,786 B2* | 2/2008 | Kikuchi | G06K 7/0008 455/41.1 |
| 10,033,437 B1* | 7/2018 | Bimbaud | H04B 5/79 |
| 2009/0153297 A1 | 6/2009 | Gardner | |
| 2019/0102662 A1 | 4/2019 | Snell et al. | |
| 2020/0327533 A1* | 10/2020 | Deprun | H04M 1/72403 |
| 2022/0076089 A1* | 3/2022 | Alary | G06Q 20/40145 |
| 2024/0187408 A1* | 6/2024 | Köhn | G06F 21/32 |

FOREIGN PATENT DOCUMENTS

| | | | |
|---|---|---|---|
| EP | 4068570 A1 | 10/2022 | |
| EP | 4113361 A1 | 1/2023 | |
| JP | 2005252232 A * | 9/2005 | |
| WO | 2016135437 A2 | 9/2016 | |
| WO | 2020051553 A1 | 3/2020 | |
| WO | WO-2023274673 A1 * | 1/2023 | G06K 7/10178 |
| WO | WO 2023094627 A1 | 6/2023 | |
| WO | WO 2023131609 A1 | 7/2023 | |

* cited by examiner

*Primary Examiner* — Sonji N Johnson
(74) *Attorney, Agent, or Firm* — Seed Intellectual Property Law Group LLP (57) ABSTRACT

A device facilitates personalizing an integrated circuit card including a fingerprint sensor. The device includes a support sheet, a first antenna located on top of and in contact with a surface of the support sheet, and at least one second antenna located on top of and in contact with the surface of the support sheet. The at least one second antenna is connected to the first antenna.

17 Claims, 3 Drawing Sheets

PERSONALIZATION DEVICE AND METHOD FOR INTEGRATED CIRCUIT CARD

BACKGROUND

Technical Field

The present disclosure generally concerns electronic devices, more particularly integrated cards including a biometric sensor, or biometric cards. The present disclosure further concerns devices and methods for personalizing biometric cards.

Description of the Related Art

For a biometric card to be usable by its holder, for example in order to perform contactless payments, in a case where the biometric card is a contactless payment card, a step of personalization, of registration, or enrolment of the biometric card is previously implemented. During this step, reference biometric data, for example minutiae characteristic of the card holder, are stored in a memory of the card. The reference biometric data are used as a comparison basis during subsequent uses of the card, the data acquired by the biometric sensor being compared with the reference data to enable to authenticate the card holder.

Biometric card personalization devices and methods have been provided. However, the implementation of existing biometric card personalization devices and methods turns out being constraining for the holder, or user, of the card.

BRIEF SUMMARY

There exists a need to improve existing biometric card personalization devices and methods. There more particularly exists a need to provide simpler, less expensive, and more environmentally-friendly biometric card personalization devices and methods than existing devices and methods.

An embodiment provides an integrated circuit card personalization device including a fingerprint sensor, the device including:
  a support sheet;
  a first antenna located on top of and in contact with a surface of the support sheet; and
  at least one second antenna located on top of and in contact with said surface of the support sheet, said at least one second antenna being connected to the first antenna.

According to an embodiment, the support sheet is made of a fibrous cellulose material.

According to an embodiment, the support sheet is a sheet of paper having a mass per unit area in the range from 30 to 150 $g/m^2$, preferably in the range from 50 to 100 $g/m^2$.

According to an embodiment, the device further includes a protection sheet coating the support sheet on the side of said surface.

According to an embodiment, the device includes a single second antenna.

According to an embodiment, the device includes at least two second antennas series-connected between contacting elements of the first antenna.

According to an embodiment, the device includes at least two second antennas associated in parallel between contacting elements of the first antenna.

An embodiment provides a method of use of a device such as described, the method including the following steps:

a) placing, in front of the first antenna, an integrated circuit card including a fingerprint sensor;
b) placing, in front of said at least one second antenna, a near-field communication device;
c) acquiring, by means of the fingerprint sensor, biometric data characteristic of a user; and
d) storing the biometric data into a memory of the integrated circuit card.

According to an embodiment, the near-field communication device powers the integrated circuit card.

According to an embodiment, the near-field communication device is a cell phone.

According to an embodiment, the integrated circuit card is a contactless payment biometric bank card.

According to an embodiment, at step a), the integrated circuit card is mechanically fastened to the personalization device.

An embodiment includes a method including prompting, with an electronic device placed over a first antenna of a support sheet of a personalization device, a user to enable a biometric sensor of an integrated circuit card positioned on a second antenna of the support sheet to capture biometric data of the user. The method includes powering the integrated circuit card with the electronic device by energizing the first antenna with the electronic device. The first antenna is electrically coupled to the second antenna. The method includes providing an indication to the user from the electronic device that the integrated circuit card has captured the biometric data.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only steps and elements that are useful for the understanding of the described embodiments have been illustrated and described in detail. In particular, the generation of the signals and data exchanged in near field as well as their interpretation has not been detailed, the described embodiments and implementation modes being compatible with usual techniques of generation and interpretation of these signals and data.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
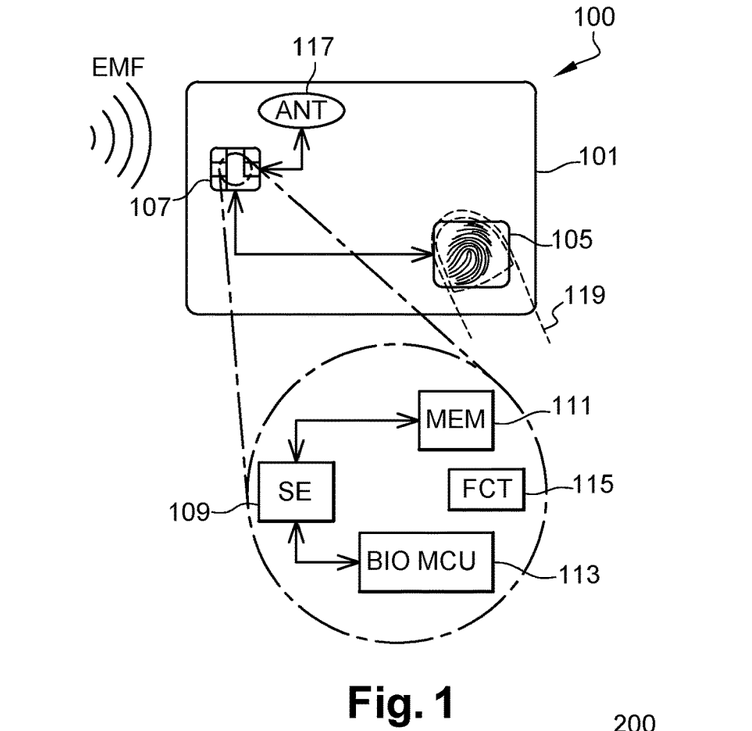
FIG. 1 schematically shows in the form of blocks an example of a near-field communication system of the type to which apply, as an example, described embodiments.

FIG. 1 schematically shows in the form of blocks an example of a near-field communication system 100, or NFC system, of the type to which apply, as an example, described embodiments.

In the shown example, NFC system 100 includes an integrated circuit card 101. An electromagnetic field EMF is for example emitted by a device (not shown) and captured by the card 101 located within range. This particularly enables card 101 to be powered with electrical energy by this device. This may further enable the device and card 101 to exchange data.

As an example, card 101 is a bank card, for example a contactless payment card, a transport card, an identification or personal access card, etc. The device emitting the electromagnetic field EMF is for example an electronic payment terminal, in a case where card 101 is a bank card, an access terminal, in a case where card 101 is a personal access card, a validating machine, in a case where card 101 is a card used as a support for one or a plurality of transport tickets, etc.

In the shown example, card 101 includes a biometric sensor 105, for example a fingerprint sensor or reader. Biometric sensor 105 is for example located on the front side of card 101, as illustrated in FIG. 1.

In the shown example, biometric card 101 further includes an electronic chip 107, for example located on the same side of card 101 as biometric sensor 105. Chip 107 is symbolized, in FIG. 1, by contacts located on the front side of card 101, for example flush with the front surface of card 101. These contacts are for example intended to transmit power supply and data signals during a communication with contact between card 101 and a reader (not shown), for example when card 101 is inserted into an electronic payment terminal, in the case where card 101 is a bank card.

In the shown example, chip 107 includes a processing unit 109 (SE). Processing unit 109 is for example intended to process data called secure or secret, that is, data having their access reserved to certain users or circuits. Processing unit 109 may more precisely be used to protect secret data, for example personal data specific to a user, owner, or holder of card 101, and to perform operations on, or by means of, these secret data. Processing unit 109 is for example configured so that the secret data that it processes cannot be discovered by an attacker or pirate. As an example, processing unit 109 is a microcontroller, for example a secure microcontroller.

In the shown example, chip 107 further includes a memory 111 (MEM). As an example, memory 111 may include areas intended to store program code instructions and/or variables for the execution of operations by processing unit 109. The memory 111 of chip 107 may further include areas called secure. As an example, these secure areas may be used to store the secret data of the user of card 101. More precisely, the secure areas of memory 111 may contain one or a plurality of so-called reference fingerprints of card holder 101, with which data originating for the processing of images acquired by biometric sensor 105 are for example compared during an authentication procedure.

In the shown example, chip 107 further includes a microcontroller 113 (BIO MCU). Microcontroller 113 is for example used to process data acquired by the fingerprint sensor 105 of biometric card 101. Microcontroller 113 is for example capable of executing a greater number of instructions per second than processing unit 109, for a substantially equivalent energy consumption. As an example, microcontroller 113 is a biometric microcontroller, for example, a microcontroller dedicated to executing instructions for processing images originating from fingerprint sensor 105.

Microcontroller 113 and secure microcontroller 109 may be formed inside and on top of a same substrate, for example a piece of wafer made of a semiconductor material. As a variant, microcontrollers 109 and 113 may be formed on distinct substrates.

The chip 107 of biometric card 101 may also include one or a plurality of other elements, not detailed in FIG. 1. These elements are symbolized, in FIG. 1, by a functional block 115 (FCT).

In the shown example, card 101 further includes an antenna 117 (ANT). Antenna 117 is for example adapted to capturing electromagnetic field EMF when card 101 is located within range of the device emitting the field. In practice, antenna 117 is for example coupled to processing unit 109 by an impedance matching and filtering circuit.

As an example, processing unit 109 includes modules or macrocells for managing the electrical energy captured by antenna 117 from electromagnetic field EMF. These modules are for example intended to manage the electric power supply of fingerprint sensor 105 and of microcontroller 113 according to the energy available from field EMF.

During a communication, or transaction, implementing card 101, a step of verification of the identity of the user of card 101 may be implemented. In this case, the user is for example asked to lay a finger 119 on fingerprint sensor 105. One or a plurality of images of the user's finger 119 are for example acquired by the fingerprint sensor 105 of card 101. The image(s) acquired by sensor 105 are then for example processed by microcontroller 113 to extract biometric characteristics or data, for example singular points or minutiae. These data are then for example compared with reference biometric data, previously stored for example in the memory 111 of card 101, to control the identity of the user of card 101.

The storage of the reference biometric data, characteristic of the user or of card holder 101, is performed during a step of personalization, registration, or enrolment of card 101 prior to its use. To implement this step, the user generally has to go, for example to a bank teller belonging to the institution having issued card 101, in a case where card 101 is a bank card.

As a variant, the institution having issued card 101 may provide sending, to the home of the user of card 101, an electronic personalization device including a slot or notch intended to receive card 101. The personalization device is for example adapted to communicating with contact with card 101, and for example includes contacts positioned in front of the contacts of the chip 107 of card 101 when the latter is inserted into the device.

Such a device for example includes a processing unit, for example a microcontroller, enabling to control operations of image acquisition by the fingerprint sensor 105 of card 101, operations of processing of these images to extract therefrom the reference minutiae, and operations of storage of the reference minutiae into card 101. The device for example further includes an embedded energy source, for example a battery, thus enabling to do away with the constraints specific to the energy distribution networks of the different countries, or a mains power supply. Further, the device may include indicator lights, for example light-emitting diodes, or LEDs, located on the front side of the device and enabling to guide the user during the execution of the operations of personalization of card 101.

A disadvantage of existing biometric card personalization devices lies in the fact that their use is very unintuitive for the user of card 101. This is particularly due to the fact that diodes provide very limited possibilities of display of information or indications. Further, the supply and the sending of the personalization device is generally performed at the expenses of the user of card 101. These practical and economical disadvantages tend to curb the adoption of biometric cards such as card 101.

Another disadvantage of current electronic biometric card personalization devices lies in the fact that they are single-use and have a duration of use in the order of a few minutes only. Further, in a case where the user desires to replace card 101, for example with another more recent card, the personalization device risks no longer being compatible with this other card. In addition to the previously-mentioned economical impact, the manufacturing and the use of current biometric card personalization devices have adverse environmental impacts, which should desirably be avoided.

Figure 2:
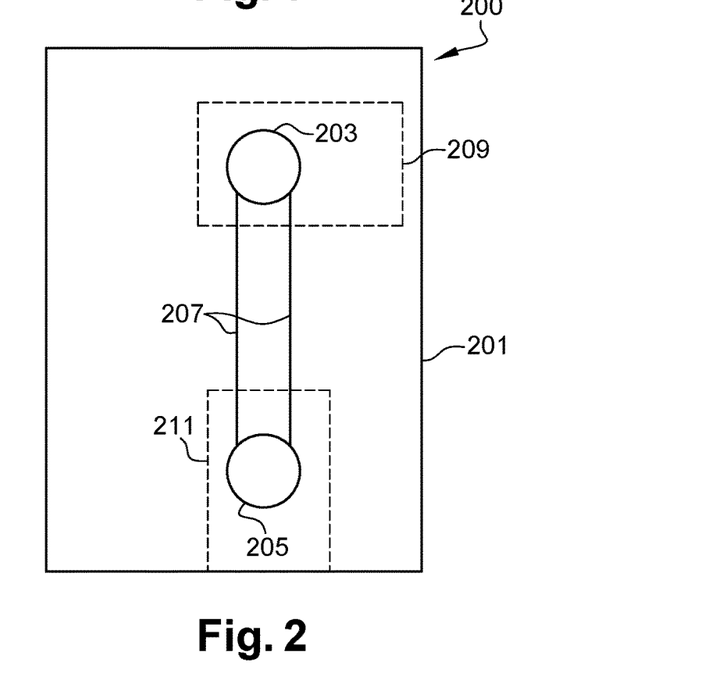
FIG. 2 is a partial and simplified top view of a biometric card personalization device, according to an embodiment.

FIG. 2 is a partial and simplified top view of a device 200 of personalization of a biometric card, for example biometric card 101, according to an embodiment.

In the shown example, device 200 includes a support sheet 201. Support sheet 201 is for example made of a relatively flexible material, for example a fibrous cellulose material such as paper or cardboard. Support sheet 201 for example has a flexibility such that it can be folded, for example in three, inserted into an envelope and sent, for example by mail, to card holder 101. As an example, support sheet 201 is a paper sheet having a mass per area unit, or weight, in the range from 30 to 150 g/m², for example more precisely in the range from 50 to 100 g/m². Support sheet 201 for example has, as in the example illustrated in FIG. 2, a circumference of rectangular shape. This example is however not limiting, and support sheet 201 may have, as a variant, a circumference of any shape, for example square, oval, circular, etc. As an example, support sheet 201 is a paper sheet with an A4 format.

In the illustrated example, two antennas 203 and 205 (each symbolized by a circle, in FIG. 2) are located on top of and in contact with a surface of support sheet 201, for example its upper surface, in the orientation of FIG. 2. In the shown example, antennas 203 and 205 are connected together by conductive tracks 207 located on top of and in contact with the surface of support sheet 201 having antennas 203 and 205 located thereon (the upper surface of support sheet 201, in this example). Conductive tracks 207 and antennas 203 and 205 are for example made of a same material. As an example, antennas 203 and 205 and conductive tracks 207 are made of a metal, for example copper or aluminum, or of a metal alloy.

Antennas 203 and 205 and conductive tracks 207 are for example formed by inlay, for example by an ultrasonic wire laying method implementing a device including a coil of conductive wire powering a sonotrode enabling to form antennas 203 and 205 and conductive tracks 207 by mechanical fastening of the conductive wire to support sheet 201.

Although this has not been illustrated in FIG. 2, an additional protection sheet, for example having characteristics similar or identical to those of support sheet 201, may advantageously cover support sheet 201 on the side of its surface supporting antennas 203 and 205 and conductive tracks 207, so that antennas 203 and 205 and conductive tracks 207 are interposed between support sheet 201 and the protection sheet. The protection sheet covering support sheet 101 for example enables to avoid short-circuits, for example between conductive tracks 207, and to ascertain that antennas 203 and 205 and conductive tracks 207 do not separate from support sheet 201 subsequently to the manufacturing of device 200. As an example, the protection sheet is mechanically fastened to support sheet 201 by gluing, by pressing, or by any other technique enabling to avoid the deterioration of antennas 203 and 205 and of conductive tracks 207, and guaranteeing that the protection sheet and support sheet 201 will remain united until the step of personalization of card 101 has been carried out.

The antenna 203 of device 200 is for example intended to be placed in front of the biometric card to be personalized, for example card 101. Card 101 may be mechanically fastened to device 200, for example by a glue layer or a piece of adhesive band interposed between support sheet 201 and card 101. In the case where personalization device 200 includes the previously-described protection sheet, card 101 is for example mechanically fastened to the external surface of the protection sheet. Advantageously, card 101 is fastened in such a way as to obtain an optimal electromagnetic coupling between antennas 117 and 203, the antenna 117 of card 101 being for example placed in front of the antenna 203 of support sheet 201 in a position where the center of antenna 117 is located substantially vertically in line with the center of antenna 203. The dimensions of card 101 and of antenna 117, as well as the position of antenna 117 in card 101, are for example standardized. The position of card 101 relative to support sheet 201 can then be standardized, which enables to ease the manufacturing of device 200 and the mechanical assembly of card 101 with device 200.

Antenna 205 is for example intended to be placed in front of a cell phone, or smartphone, adapted to communicating in near field with card 101, as described hereabove in relation with FIG. 1. As an example, the cell phone intended to be above antenna 205 includes a near-field communication antenna, for example similar or identical to the antenna 117 of biometric card 101.

In the shown example, device 200 includes a template 209 for positioning biometric card 101 symbolized, in FIG. 2, by a rectangle in dotted lines. In a case where card 101 is not fastened to support sheet 201, template 209 for example enables to help the user optimally position biometric card 101 with respect to support sheet 201, for example so that the antenna 117 of card 101 is placed in front of the antenna 203 of device 200 to optimize the electromagnetic coupling between these antennas. The template 209 for positioning the biometric card to be personalized is for example printed on support sheet 201 or on the protection sheet, in the case where device 200 is provided therewith. Similarly, another positioning template 211 may be provided around antenna 205 to guide the user to enable him/her to place the cell phone in an optimal position with respect to support sheet 201, that is, a position optimizing the electromagnetic coupling between the antenna of the cell phone and the antenna 205 of personalization device 200. This example is however not limiting, and each template 209, 211 may, as a variant, be omitted.

In addition to antennas 203 and 205 and tracks 207, device 200 for example includes no other conductive element. In particular, device 200 is for example deprived of electronic components such as integrated circuit chips.

Although this has not been detailed in FIG. 2, device 200 may include instructions relative to steps of personalization of a biometric card, for example card 101. There instructions may include text, photographs, drawings, flowcharts, etc., for example enabling to help the user implement device 200 on personalization of card 101. The instructions are for example printed on support sheet 201 or on the protection sheet, in the case where device 200 includes one. Further, device 200 may of course include other inscriptions, for example general information, commercial- or advertising-purpose inscriptions, etc.

Figure 3:
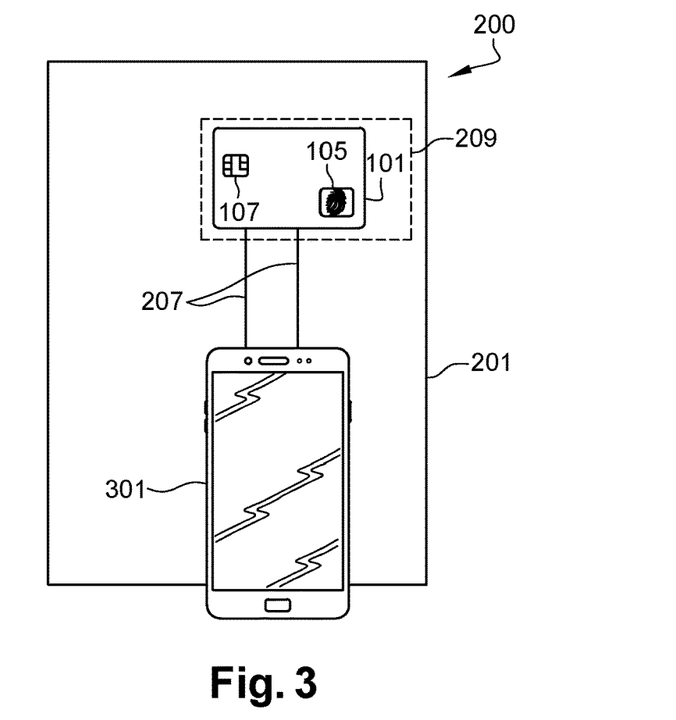
FIG. 3 schematically illustrates an example of use of the device of FIG. 2. according to an embodiment.

FIG. 3 schematically illustrates an example of use of the device 200 of FIG. 2.

In the shown example, biometric card 101 is arranged in front of the antenna 203 of device 200. Card 101 is for example placed inside of the positioning template 209 provided to assist in aligning the biometric card 101 with the antenna 203. Similarly, a cell phone 301, or smartphone, is positioned in front of the antenna 205 of device 200. Cell phone 301 is for example placed inside of template 211. Antennas 203 and 205, respectively covered with card 101 and with cell phone 301, are not visible in FIG. 3. As an example, device 200 is placed flat on a support, for example table, and card 101 and cell phone 301 are for example held in the position illustrated in FIG. 3 all along the steps of personalization of card 101. Advantageously, device 200, card 101, and cell phone 301 remain motionless without an action from the user, card 101 being for example attached to device 200 as previously discussed and the weight of the cell phone enabling to immobilize device 200 with respect to the support. This improves the general user-friendliness and for example enables to avoid problems occurring in case of an unexpected taking away of the card 101 and/or of phone 301 from personalization device 200.

The position of antenna 205 on the support sheet 201 of personalization device 200 is for example adjusted according to the cell phone 301 intended to be placed in front of antenna 205, for example according to the position of the near-field communication antenna inside of cell phone 301. As an example, the position of the antenna 205 of device 200 is defined according to the type, for example according to a brand and/or to a model, of the cell phone 301 owned by card holder 101. This advantageously enables to optimize the electromagnetic coupling between cell phone 301 and the antenna 203 of personalization device 200 during the steps of personalization of card 101.

As a variant, a plurality of antennas, for example of the type of the antenna 205 intended to be placed in front of cell phone 301, may be provided on support sheet 201 as discussed in further detail hereafter.

In the example of use illustrated in FIG. 3, cell phone 301 emits, by its communication antenna (not shown), an electromagnetic field which is captured by the antenna 205 of personalization device 200 in the form of an electric current running through antenna 205. This electric current further flows, due to the connection of antenna 205 to antenna 203 by conductive tracks 207, through the antenna 203 arranged in front of card 101. Antenna 203 then emits an electromagnetic field which is a function of the electric current running therethrough, for example a field similar or identical to the electromagnetic field emitted by the antenna of cell phone 301. Thus, device 200 transmits, to card 101, the electromagnetic field emitted by device 301. This enables to power card 101 with electrical energy via cell phone 301. Data may further be exchanged between cell phone 301 and card 101 during the step of personalization of card 101, for example instructions enabling to control operations to be implemented by card 101 to acquire and store the reference biometric data of card holder 101.

Figure 4:
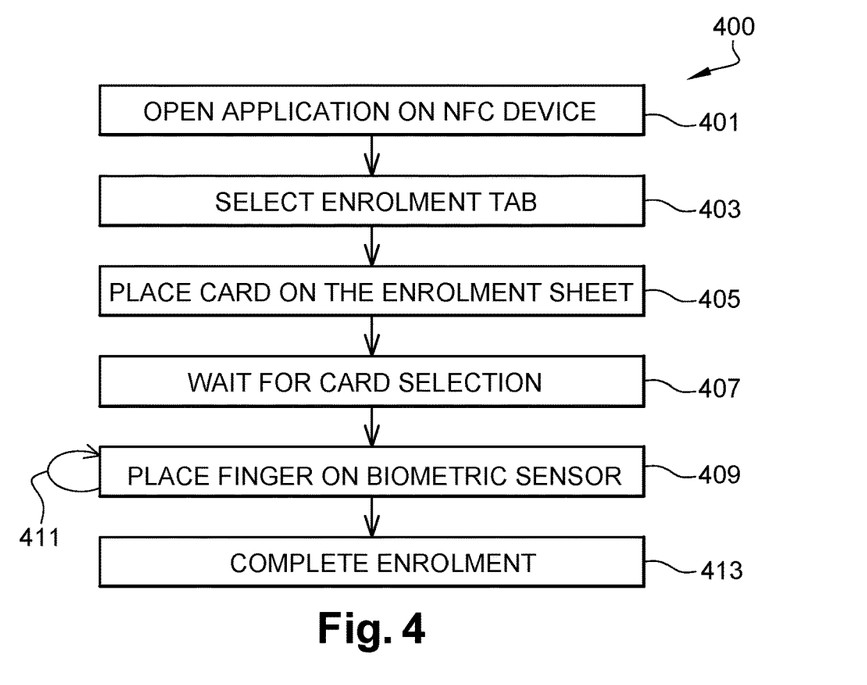
FIG. 4 is a flowchart illustrating steps of a biometric card personalization method, according to an embodiment.

FIG. 4 is a flowchart 400 illustrating successive steps of a method of personalization of a biometric card, for example card 101, according to an embodiment.

During an initial step 401 (OPEN APPLICATION ON NFC DEVICE), the user launches an application on cell phone 301. In the case where the card 101 to be personalized is a bank card, the application is for example an online bank application, for example an application from which clients of the bank may in particular consult the balance of their account, perform bank transfers, subscribe to new offers, etc., to which biometric card personalization functionalities have been integrated. As a variant, the application may be an application dedicated to biometric card personalization.

During another step 403 (SELECT ENROLMENT TAB), the user of card 101 selects for example a tab of the application giving access to biometric card personalization functionalities, in the case of an application not entirely dedicated to biometric card personalization. This enables for example to start of the operations of personalization of card 101.

Prior to the beginning of the operations of personalization of card 101, for example at step 401 or at step 403, an authentication operation may be provided to check the identity of the user desiring to personalize card 101. As an example, according to the desired security level, the authentication may involve one or a plurality of factors, for example selected from among a secret code (preferably sent separately from the sending of card 101), a fingerprint control by a sensor of cell phone 301, a face recognition implemented by an image sensor of cell phone 301, etc.

During still another step 405 (PLACE CARD ON THE ENROLMENT SHEET), the user is asked to place card 101 on device 200, in front of antenna 203. The user can then for example place card 101 inside of template 209, as previously discussed in relation with FIG. 3. As an example, a display of cell phone 301 may display a diagram or an animation enabling to assist the user in the execution of this operation. As a variant or as a complement, the user may refer to instructions written on device 200 as previously discussed in relation with FIG. 2. This example is however not limiting, and step 405 may be omitted, for example in a case where card 101 is fastened to device 200 at the time of its reception by card holder 101, card 101 then already being positioned in front of the antenna 203 of device 200.

During still another step 407 (WAIT FOR CARD SELECTION), the user is asked to wait for card 101 to be detected or selected by cell phone 301. During this step, cell phone 301 for example emits an electromagnetic field to attempt detecting card 101. The electromagnetic field radiated by the internal antenna of cell phone 301 is then captured by the antenna 205 of device 200 and then transmitted in the form of a current, by conductive tracks 207, to antenna 203. Antenna 203, crossed by this current, then emits in turn an electromagnetic field captured by card 101. Once card 101 has been detected, phone 301 for example more precisely detecting an amplitude and/or phase variation of the electromagnetic field that it emits, a near-field communication is established between card 101 and phone 301, and a secure communication channel is for example opened.

During still another step 409 (PLACE FINGER ON BIOMETRIC SENSOR), the user is asked to place a finger on the fingerprint sensor 105 of biometric card 101. At least one image of the fingerprint of the user's finger is then captured by sensor 105, and then processed, for example, extract therefrom the reference minutiae. These reference minutiae are then stored in card 101, for example in the memory 111 of chip 107. These operations may for example be repeated (arrow 411) for one or a plurality of other fingers of the same user and/or for one or a plurality of other fingers of another user of card 101.

During still another step 413 (COMPLETE ENROLMENT), the operations of personalization of card 101 are over. The secure channel opened at step 407 is then for example closed. Hardware and/or software operations may be provided to guarantee an irreversibility of the personalization method. This particularly enables to avoid for an ill-intentioned person to be able to replace the reference minutiae stored in card 101 during the execution of the method of personalization of card 101.

Figure 5:
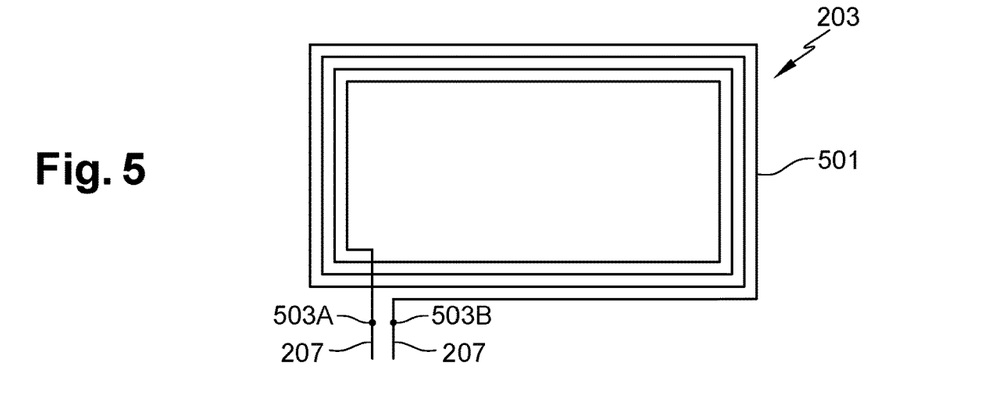
FIG. 5 schematically and partially shows an example of an antenna of a biometric card personalization device, according to an embodiment.

FIG. 5 schematically and partially shows an example of an antenna of a biometric card personalization device, for example the antenna 203 of personalization device 200 previously described in relation with FIG. 2.

In the shown example, antenna 203 has a general spiral shape. The antenna 203 illustrated in FIG. 5 more precisely includes a conductive track 501 forming a winding including a plurality of non-contiguous concentric spirals (four concentric spirals, in the shown example). In the illustrated example, the ends of conductive track 501 are connected to contacting elements 503A and 503B, for example electrodes, terminals, or pads, enabling to connect the conductive track 501 of antenna 203 to conductive tracks 207. More precisely, in the shown example, the end of conductive track 501 located inside of the winding is connected to contacting element 503A and the end of conductive track 501 located outside of the winding is connected to contacting element 503B. Contacting elements 503A and 503B are for example both located outside of the winding formed by conductive track 501, the end of conductive track 501 located inside of the winding being for example connected to contacting element 503B via a conductive track portion electrically insulated from the spirals formed by conductive track 501.

In the shown example, antenna 203 has a circumference of substantially rectangular shape. This example is however not limiting, and antenna 203 may, as a variant, have a circumference of any shape, for example square, oval, circular, etc.

The antenna 117 of biometric card 101, the antenna 205 of personalization device 200, and the near-field communication antenna of cell phone 301 for example each have a structure similar or identical to that of antenna 203 such as discussed hereabove in relation with FIG. 5. As an example, the contacting element 503A of antenna 203 is connected, by one of conductive tracks 207, to the contacting element 503B of antenna 205, and the contacting element 503B of antenna 203 is connected, by the other conductive track 207, to the contacting element 503A of antenna 205.

Figure 6:
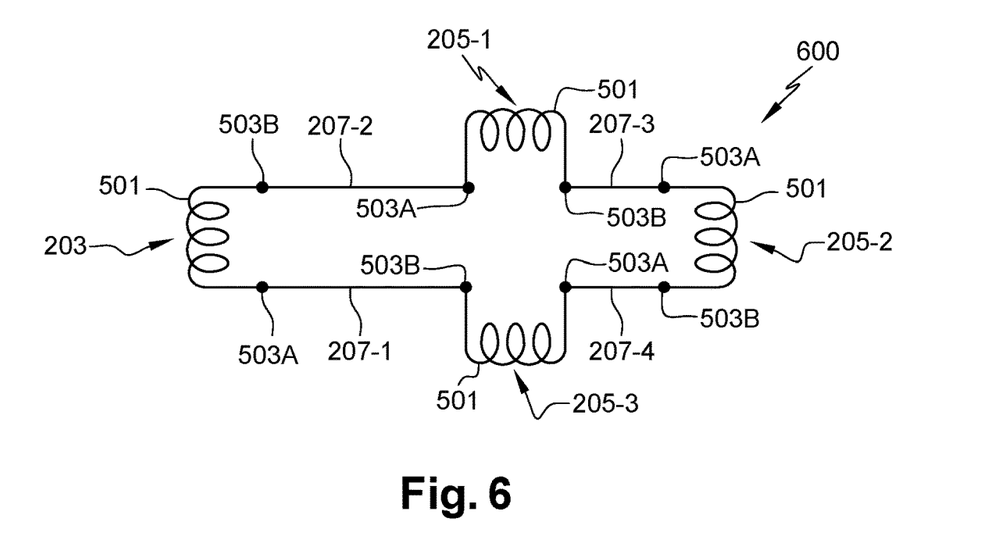
FIG. 6 schematically and partially shows an arrangement of antennas of a biometric card personalization device, according to an embodiment.

FIG. 6 schematically and partially shows an arrangement 600 of antennas of a personalization device, for example similar to the previously-described device 200, of a biometric card, for example card 101, according to an embodiment.

FIG. 6 more precisely illustrates an example where the personalization device includes, in addition to antenna 203 intended to be placed in front of the biometric card to be personalized, a plurality of antennas 205 (three antennas 205 1, 205 2, and 205 3) intended to be placed in front of cell phone 301. In the shown example, the antennas 205 1, 205 2, and 205 3 of arrangement 600 are series-connected between the contacting elements 503A and 503B of antenna 203. Arrangement 600 is for example formed on a support sheet similar or identical to support sheet 201. As an example, arrangement 600 may substitute to antennas 203 and 205 and to conductive tracks 207 in device 200.

As an example, in a case where the antennas 203, 205 1, 205 2, and 205 3 of arrangement 600 each have a structure similar or identical to that previously described in relation with FIG. 5:
    the contacting elements 503A and 503B of antenna 203 are respectively connected, by conductive tracks 207 1 and 207 2, to the contacting element 503B of antenna 205 3 and to the contacting element 503A of antenna 205 1; and
    the contacting elements 503A and 503B of antenna 205 2 are respectively connected, by conductive tracks 207 3 and 207 4, to the contacting element 503B of antenna 205 1 and to the contacting element 503A of antenna 205 3.

Figure 7:
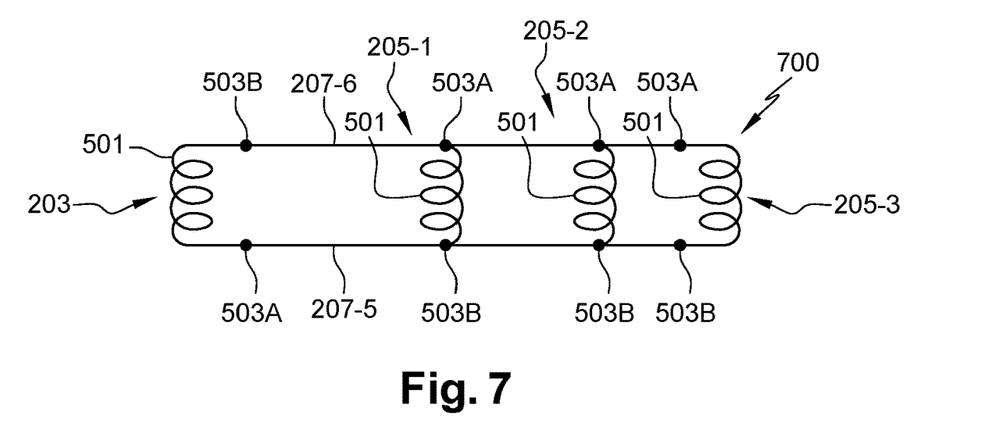
FIG. 7 schematically and partially shows another arrangement of antennas of a biometric card personalization device, according to an embodiment.

FIG. 7 schematically and partially shows another arrangement 700 of antennas of a personalization device, for example similar to the previously-described device 200, of a biometric card, for example card 101, according to an embodiment. The arrangement 700 of FIG. 7 includes elements common with the arrangement 600 of FIG. 6. These common elements will not be detailed again hereafter.

FIG. 7 more precisely illustrates an example where antennas 205 1, 205 2, and 205 3 are associated in parallel between contacting elements 503A and 503B of antenna 203.

As an example, in a case where the antennas 203, 205 1, 205 2, and 205 3 of arrangement 700 each have a structure similar or identical to that previously described in relation with FIG. 5:
    the contacting element 503A of antenna 203 is connected, by a conductive track 207 5, to the contacting elements 503B of antenna 205 1, 205 2, and 205 3; and
    the contacting element 503B of antenna 203 is connected, by a conductive track 207 6, to the contacting elements 503A of antenna 205 1, 205 2, and 205 3.

An advantage of arrangements 600 and 700 lies in the fact that they enable the card personalization device to adapt to different types, for example different models and/or different brands, of cell phone 301. In arrangements 600 and 700, at least one of antennas 205 1, 205 2, 205 3 is used to capture the field radiated by the internal antenna of cell phone 301.

The personalization devices described hereabove in relation with FIGS. 3 to 7 have the advantage of avoiding for the user to simultaneously manipulate biometric card 101 and cell phone 301 during operations of personalization of card 101. This for example enables the user to keep his/her two hands free to perform the personalization operations, particularly to place his/her finger 119 on the biometric sensor 105 of card 101. Another advantage of the described devices lies in the fact that they enable to maintain an optimal, and substantially invariable, coupling between cell phone 301 and card 101 during the operations of personalization of card 101.

Further, personalization device 200 is less expensive, more user-friendly, and more environmentally friendly than existing devices including for example a battery and a microcontroller.

Various embodiments and variants have been described. Those skilled in the art will understand that certain features of these various embodiments and variants may be combined, and other variants will occur to those skilled in the art. In particular, the embodiments are not limited to the architecture of card 101 such as discussed hereabove in relation with FIG. 1, but more generally apply to any integrated circuit card capable of implementing near-field communication functionalities and including a biometric sensor.

Further, although the above embodiments take as an example the personalization of biometric card 101 from cell phone 301, those skilled in the art are capable of transposing these embodiments to the use of other near-field communication devices such as touch pads, laptop computers, etc., to enable to personalize card 101 by using device 200.

Although FIGS. 6 and 7 illustrate embodiments where the arrangements of antennas 600 and 700 each include three antennas 205, this example is not limiting, and the arrangements of antennas 600 and 700 may each include any number, greater than or equal to two, of antennas 205. Further, although FIGS. 6 and 7 take as an example a case where antennas 203, 205 1, 205 2, and 205 3 have a structure similar or identical to that illustrated in FIG. 5, this example is not limiting, and each antenna 203, 205 1, 205 2, 205 3 may, as a variant, have any structure.

Finally, the practical implementation of the described embodiments and variants is within the abilities of those skilled in the art based on the functional indications given hereabove. In particular, the practical implementation of the personalization method discussed hereabove in relation with FIG. 4, and more particularly of the authentication operations, is within the abilities of those skilled in the art based on the indications of the present disclosure. Further, the forming or the coding of the mobile application enabling to personalize biometric cards is within the abilities of those skilled in the art based on the indications of the present disclosure.

Further, the positioning of antennas 205 1, 205 2, and 205 3 relative to support sheet 201 is within the abilities of those skilled in the art based on the indications of the present disclosure. As an example, antennas 205 1, 205 2, and 205 3 may be arranged in a line, for example along an axis parallel to a side of support sheet 201, in a checkerboard pattern, etc.

Device (200) for personalizing an integrated circuit card (101) may be summarized as including a fingerprint sensor (105), the device including: a support sheet (201); a first antenna (203) located on top of and in contact with a surface of the support sheet; and at least one second antenna (205; 205 1, 205 2, 205 3) located on top of and in contact with said surface of the support sheet, said at least one second antenna being connected to the first antenna.

The support sheet (201) may be made of a fibrous cellulose material.

The support sheet (201) may be a sheet of paper having a mass per unit area in the range from 30 to 150 g/m2, preferably in the range from 50 to 100 g/m2.

Device may further include a protection sheet coating the support sheet (201) on the side of said surface.

Device may include a single second antenna (205).

Device may include at least two second antennas (205 1, 205 2, 205 3) series-connected between contacting elements (503A, 503B) of the first antenna (203).

Device may include at least two second antennas (205 1, 205 2, 205 3) associated in parallel between contacting elements (503A, 503B) of the first antenna (203).

Method of use of a device may be summarized as including the following steps: a) placing, in front of the first antenna (203), an integrated circuit card (101) including a fingerprint sensor (105); b) placing, in front of said at least one second antenna (205; 205 1, 205 2, 205 3), a near-field communication device (301); c) acquiring, by means of the fingerprint sensor, biometric data characteristics of a user; and d) storing the biometric data into a memory (111) of the integrated circuit card.

The near-field communication device (301) may power the integrated circuit card (101).

The near-field communication device (301) may be a cell phone.

The integrated circuit card (101) may be a biometric contactless payment bank card.

At step a), the integrated circuit card (101) may be mechanically fastened to the personalization device (200).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for personalizing an integrated circuit card including a fingerprint sensor, the device, comprising:
   a support sheet;
   a first antenna located on top of and in contact with a surface of the support sheet; and
   at least two second antennas located on top of and in contact with the surface of the support sheet, the at least two second antennas being series-connected between contacting elements of the first antenna.

2. The device according to claim 1, wherein the support sheet is made of a fibrous cellulose material.

3. The device according to claim 2, wherein the support sheet is a sheet of paper having a mass per unit area in a range from 30 to 150 g/m$^2$.

4. The device according to claim 3, wherein the sheet of paper has mass per unit area in a range from 50 to 100 g/m$^2$.

5. The device according to claim 1, further comprising a protection sheet coating the support sheet on a side of the surface.

6. A method, comprising:
   placing, in front of a first antenna of a support sheet of a personalization device, an integrated circuit card including a fingerprint sensor;
   placing, in front of at least two second antennas of the support sheet associated in parallel between contacting elements of the first antenna, a near-field communication device, wherein the at least two second antennas are electrically coupled to the first antenna;
   acquiring, via the fingerprint sensor, biometric data characteristics of a user; and
   storing the biometric data characteristics into a memory of the integrated circuit card.

7. The method according to claim 6, wherein the near-field communication device powers the integrated circuit card via the support sheet.

8. The method according to claim 6, wherein the near-field communication device is a cell phone.

9. The method according to claim 6, wherein the integrated circuit card is a biometric contactless payment bank card.

10. The method according to claim 6, wherein, placing the integrated circuit card in front of the first antenna of the support sheet includes mechanically fasting the integrated circuit card to the personalization device.

11. A method, comprising:
prompting, with an electronic device placed over a first antenna of a support sheet of a personalization device, a user to enable a biometric sensor of an integrated circuit card positioned on at least two second antennas of the support sheet to capture biometric data of the user, wherein the at least two second antennas are series-connected between contacting elements of the first antenna;
powering the integrated circuit card with the electronic device by energizing the first antenna with the electronic device, the first antenna being electrically coupled to the at least two second antennas; and
providing an indication to the user from the electronic device that the integrated circuit card has captured the biometric data.

12. The method of claim 11, wherein prompting the user to enable the biometric sensor to capture the biometric data of the user includes prompting the user to place a finger of the user on the biometric sensor.

13. The method of claim 12, wherein the biometric data includes an image of the finger of the user.

14. The method of claim 11, comprising prompting, with the electronic device, the user to align the integrated circuit card with a first alignment marking on the support sheet prior to prompting the user to enable the biometric sensor to capture the biometric data.

15. The method of claim 14, wherein aligning the integrated circuit card with the first alignment marking results in alignment of a third antenna of the integrated circuit card with the at least two second antennas of the support sheet.

16. The method of claim 14, comprising prompting, with the electronic device, the user to align the integrated circuit card with a second alignment marking on the support sheet prior to prompting the user to enable the biometric sensor to capture the biometric data.

17. The method of claim 11, comprising providing, with the electronic device, instructions to the integrated circuit card to capture the biometric data.

\* \* \* \* \*